Aug. 15, 1967 W. F. JACKSON ETAL 3,335,878
TOBACCO STITCHING MACHINE
Filed April 30, 1964 6 Sheets-Sheet 4
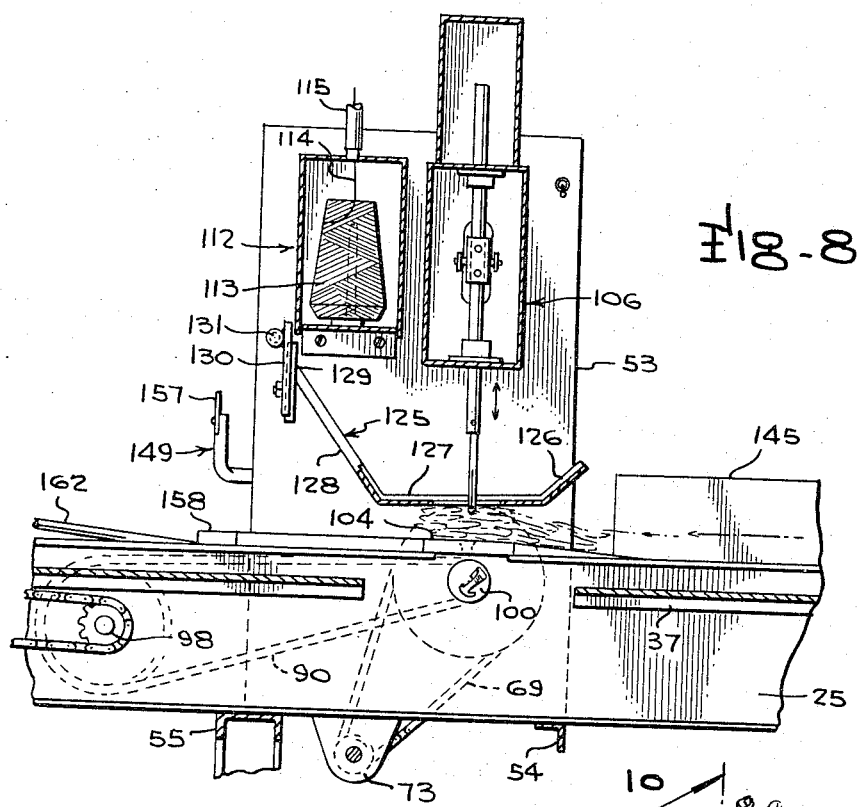
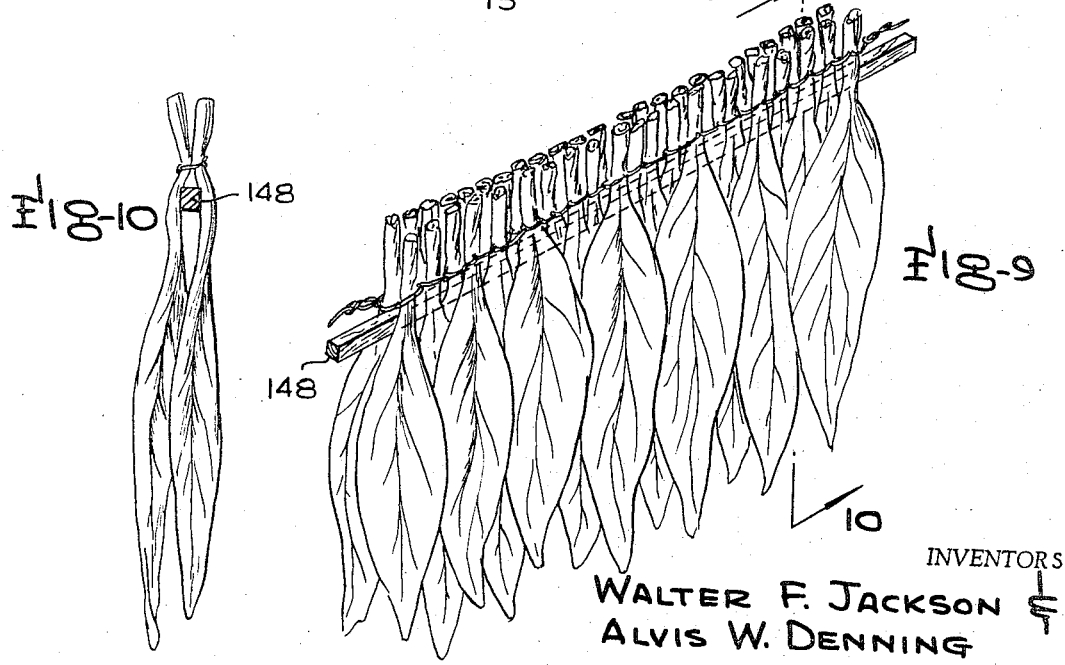
INVENTORS
WALTER F. JACKSON &
ALVIS W. DENNING
BY
Mason, Fenwick & Lawrence
ATTORNEYS Aug. 15, 1967 W. F. JACKSON ETAL 3,335,878
TOBACCO STITCHING MACHINE
Filed April 30, 1964 6 Sheets-Sheet 5
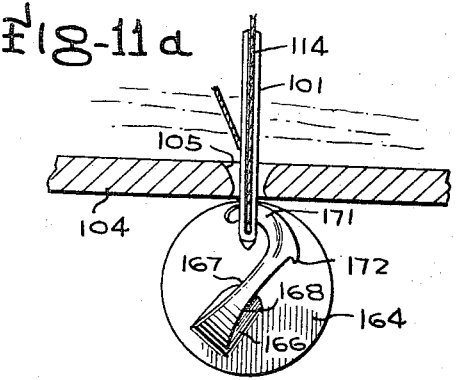
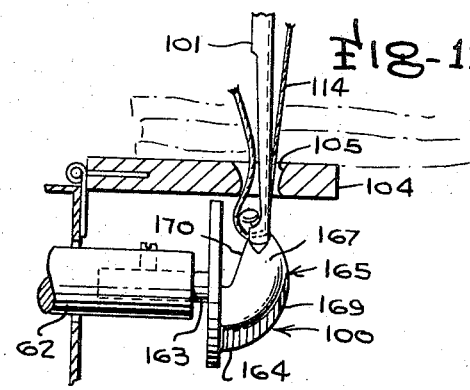
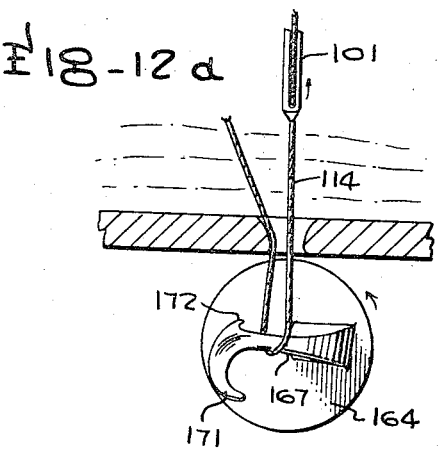
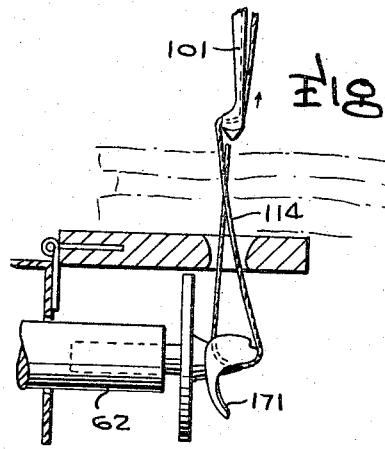
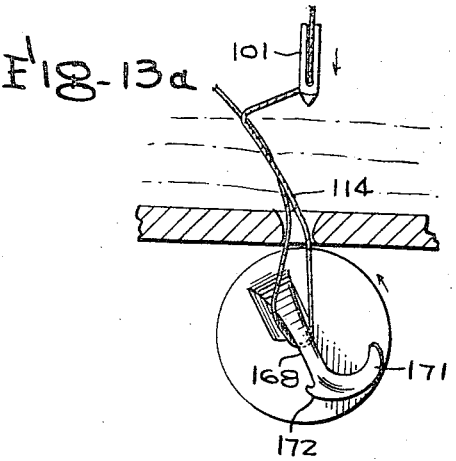
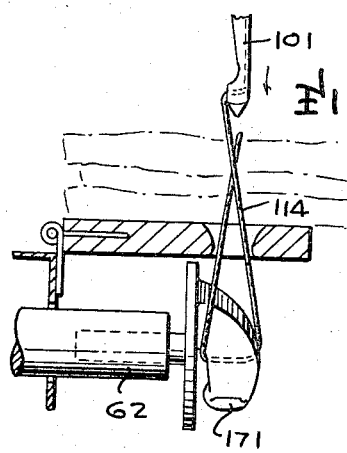
INVENTORS
WALTER F. JACKSON &
ALVIS W. DENNING
BY Mason, Fenwick & Lawrence
ATTORNEYS

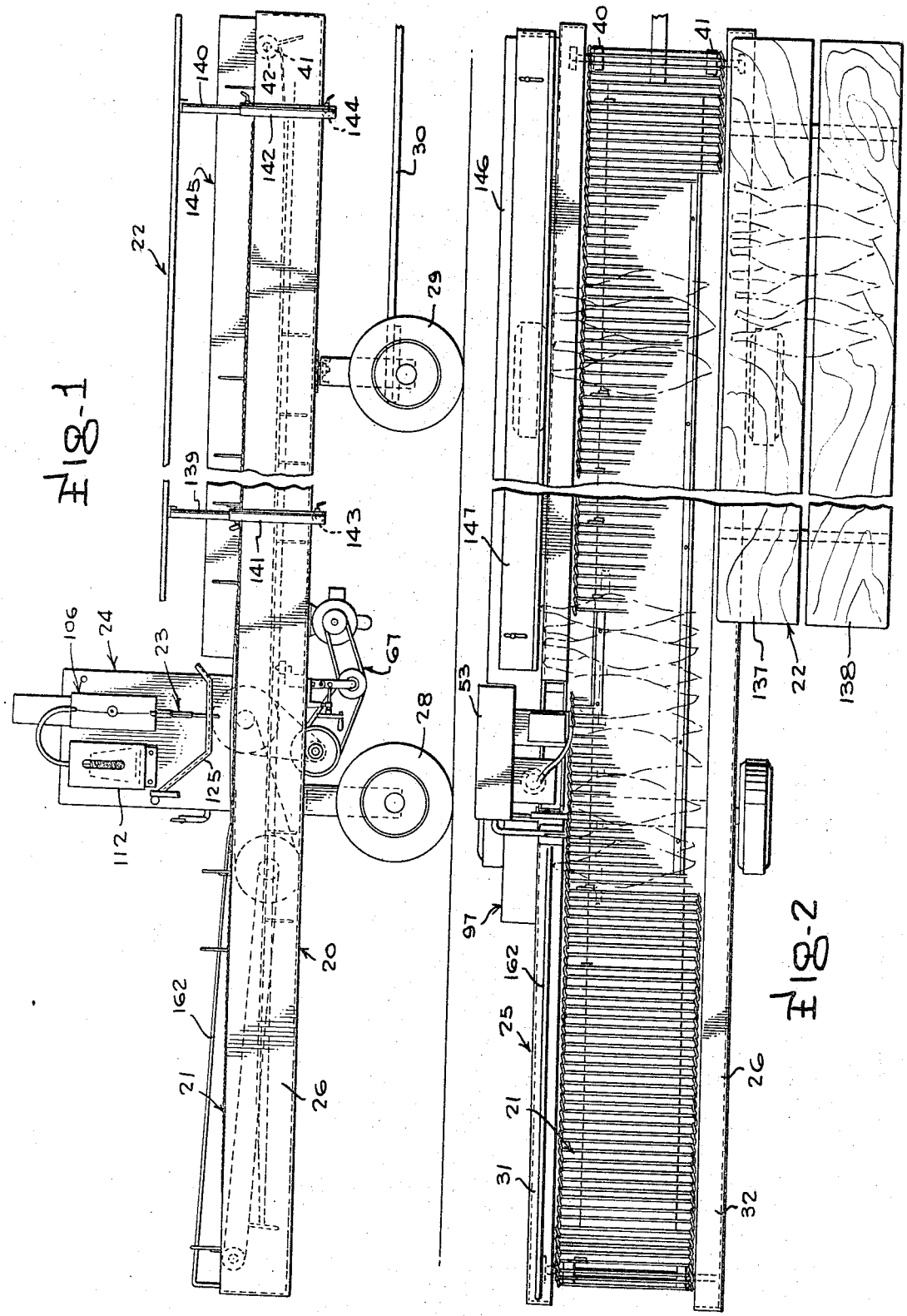

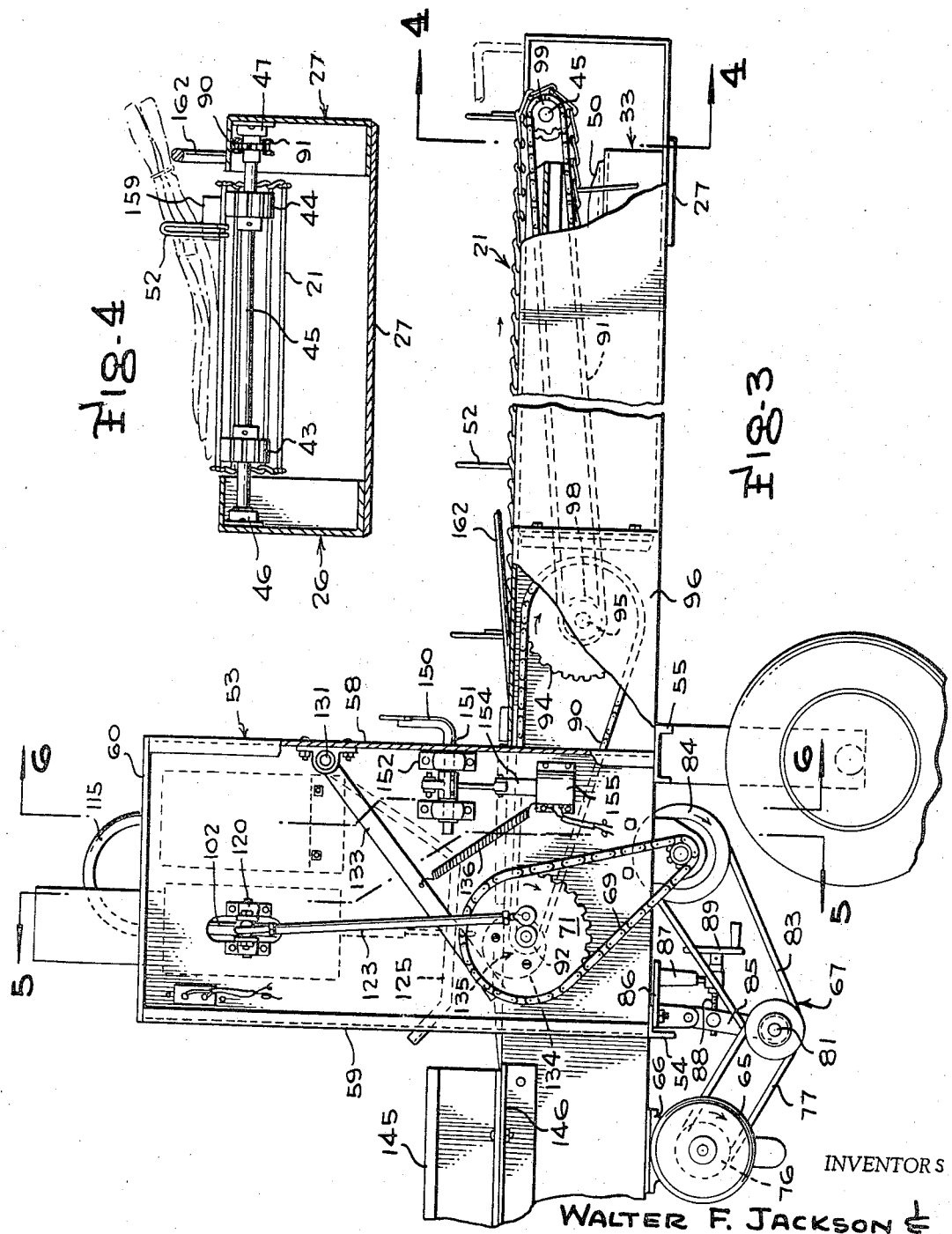

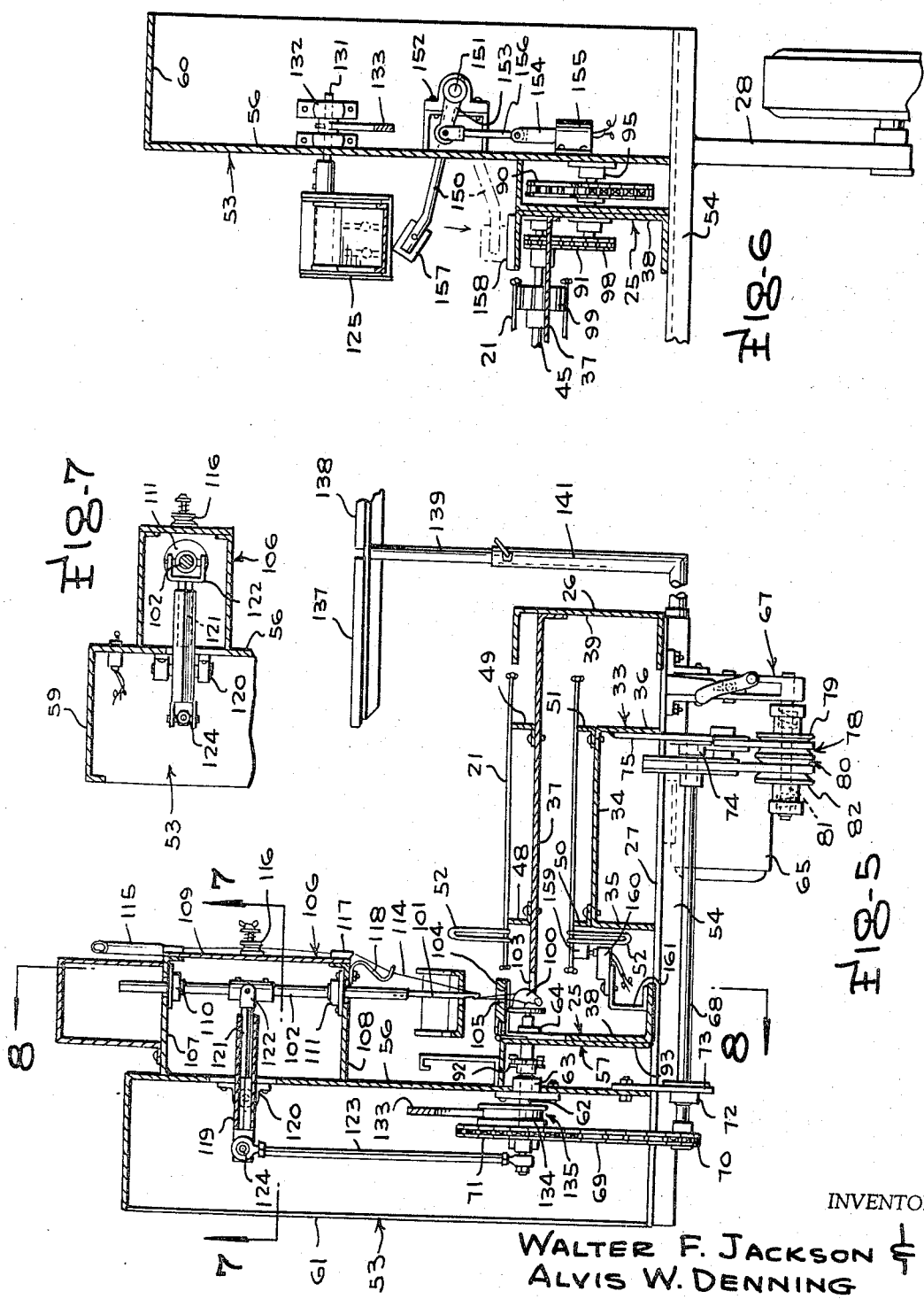

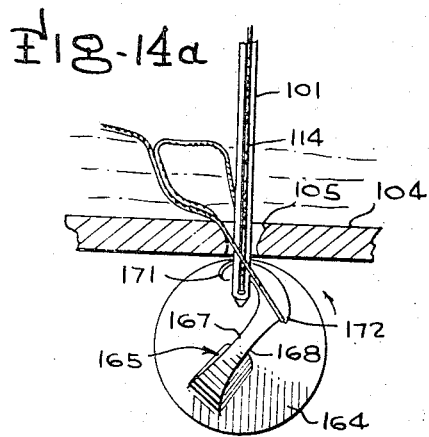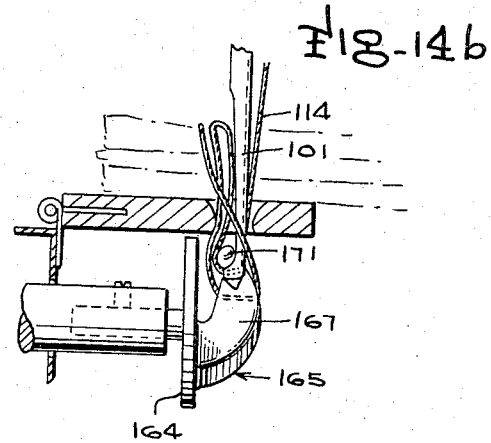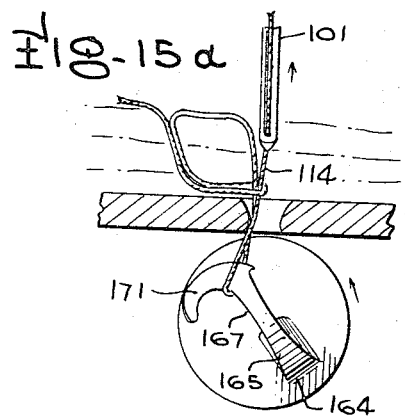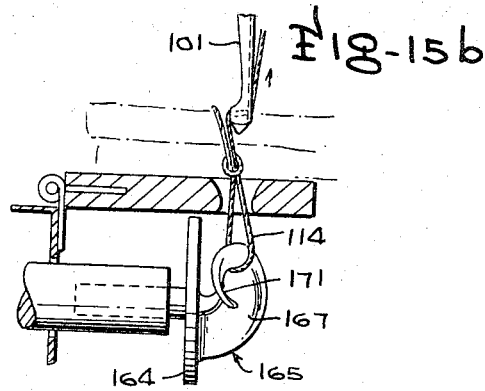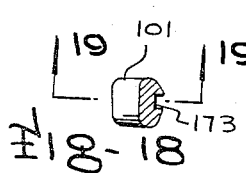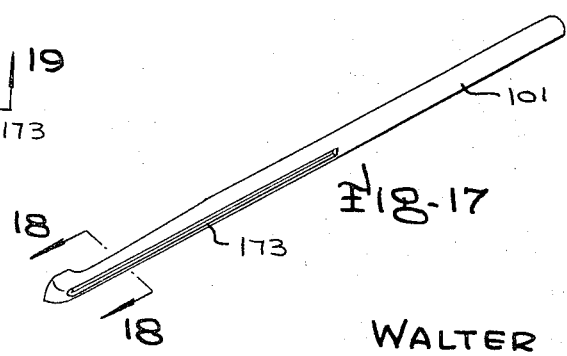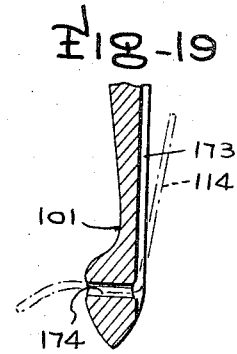

United States Patent Office 3,335,878
Patented Aug. 15, 1967

3,335,878
TOBACCO STITCHING MACHINE
Walter F. Jackson, Clinton, and Alvis W. Denning, Mount Olive, N.C., assignors to Vann Industries, Incorporated, Clinton, N.C., a corporation of West Virginia
Filed Apr. 30, 1964, Ser. No. 363,843
20 Claims. (Cl. 214—5.5)

This invention relates to tobacco harvesting apparatus and more particularly to a machine for stitching tobacco leaves.

In the harvesting of tobacco, it has been the conventional practice for workers to hand pick tobacco leaves in the field and carry them to selected areas where they normally are tied or otherwise fastened to curing sticks to facilitate subsequent handling. The curing sticks then are transported to barns and hung for curing. The practice of fastening the leaves to curing sticks has been found to be considerably time consuming, tedious and laborious, thus increasing the production costs of tobacco. Consequently, considerable effort has been made to develop machines for performing the particular function of fastening tobacco leaves to curing sticks.

Over a period of time there has been developed in the art various types of machines for stitching tobacco leaves together or curing sticks. These machines generally consist of a conveyor which supports and advances layers of leaves through a mechanism for stitching the leaves together in layers. Such machines, however, have been found not to be entirely satisfactory in construction and performance. Often, these machines provide non-uniform stitching, thereby poorly fastening the leaves on the curing sticks, causing subsequent falling out. In addition, it has been found that many of such stitching machines in the prior art are complicated in construction, experience considerable breakdown in operation and require substantial maintenance.

Accordingly, it is the principal object of this invention to provide an improved machine for fastening tobacco leaves on curing sticks.

Another more specific object of this invention is to provide an improved machine for stitching layers of tobacco leaves on curing sticks.

A further object of this invention is to provide a tobacco stitching machine which is adapted to firmly and uniformly fasten tobacco leaves to curing sticks, without causing extensive damage to the leaves.

A still further object of this invention is to provide an improved tobacco leaf stitching machine, requiring a minimum number of operators, and which is adapted to stitch layers of tobacco leaves on curing sticks continuously at a rapid rate.

Another object of this invention is to provide an improved tobacco leaf stitching machine having a novel mechanism for operating several components of the machine synchronously.

A further object of this invention is to provide an improved tobacco leaf stitching machine, having a novel needle and looper assembly.

A still further object of this invention is to provide an improved tobacco leaf stitching machine which is comparatively simple in construction, which requires a minimum amount of maintenance and which is inexpensive to operate.

Other objects and advantages of the present invention will become more apparent to those persons skilled in the art, from the following description taken in conjunction with the accompanying drawings, wherein:

FIGURE 1 is a side view of an embodiment of the invention, having portions thereof broken away;

FIGURE 2 is a top plan view of the embodiment illustrated in FIGURE 1, having portions thereof broken away;

FIGURE 3 is an enlarged fragmentary view of the embodiment shown in FIGURE 1, having portions thereof broken away and more clearly illustrating the operating mechanism of the embodiment;

FIGURE 4 is a cross-sectional view taken along line 4—4 in FIGURE 3;

FIGURE 5 is a cross-sectional view taken along line 5—5 in FIGURE 3;

FIGURE 6 is a cross-sectional view taken along line 6—6 in FIGURE 3;

FIGURE 7 is a cross-sectional view taken along line 7—7 in FIGURE 5;

FIGURE 8 is a cross-sectional view taken along line 7—7 in FIGURE 5;

FIGURE 9 is a perspective view of the end product of the embodiment illustrated in FIGURES 1 through 8, illustrating layers of tobacco fastened to a curing stick;

FIGURE 10 is a cross-sectional view taken along line 10—10 in FIGURE 9;

FIGURES 11a through 15b illustrate sequential front and side views of the needle and looper assembly during an operating cycle;

FIGURE 16 illustrates a stitching chain formed by the needle and looper assembly illustrated in FIGURES 11a through 15b;

FIGURE 17 is an enlarged perspective view of the needle used in the above mentioned needle and looper assembly;

FIGURE 18 is a cross-sectional view taken along line 18—18 in FIGURE 17; and

FIGURE 19 is a cross-sectional view taken along line 19—19 in FIGURE 18.

Briefly described, the present invention provides a tobacco leaf stitching machine generally comprising a frame, means mounted on the frame for supporting and advancing tobacco leaves along a predetermined line of travel, a needle and looper assembly mounted on the frame for stitching the tobacco leaves together in layers, and means for operating the advancing means and the needle and looper assembly synchronously. The operating means comprises rotary drive means, means for driving the rotary drive means, means for transmitting drive from rotary drive means to the advancing means, means for transmitting rotary drive from the rotary drive means to the looper, and means operatively interconnecting the rotary drive means and the needle for converting rotary motion of the rotary drive means to reciprocating motion of the needle.

Referring to the drawings, there is illustrated a preferred embodiment of the present invention. As illustrated in FIGURES 1 and 2, this embodiment generally comprises a frame or chassis 20 supporting a leaf conveyor 21 and a leaf table 22, a needle and looper assembly 23 and a mechanism 24 for operating the conveyor 21 and the needle and looper assembly 23 synchronously.

The chassis 20 consists of a pair of spaced parallel side frame members 25 and 26 which are interconnected by a plurality of rigid cross members 27. The chassis is supported on a pair of forwardly disposed wheel units 28 and a rearwardly disposed wheel unit 29 having a suitable tongue assembly 30. The side frame members 25 and 26 are substantially channel-shaped in cross-section having opposed open ends, providing coplanar top walls 31 and 32 along the entire length of the machine. Disposed between the side frame sections 25 and 26 is a channel-shaped support member 33, having a web section 34 and side sections 35 and 36 rigidly supported on the cross members 27. Spaced vertically from the web section 34 of support member 33 is a support plate 37 which is secured along its sides to the vertical web sections 38 and 39 of the side frame members 25 and 26. The support member 33 and support plate 37 extend substantially the entire length of the chassis.

The conveyor 21 is of the endless type and extends substantially along the entire length of the machine. The conveyor consists of a plurality of transversely disposed links connected together at their ends, as best illustrated in FIGURES 2 and 3. The rearward end of the shaft is entrained on a pair of spaced sprockets 40 and 41 mounted on a shaft 42, which is journaled on suitable bearings secured to the side frame members. As best shown in FIGURE 4, the forward end of the conveyor is entrained on a pair of spaced sprockets 43 and 44 mounted on a conveyor drive shaft 45, which is journaled in suitable bearings 46 and 47 mounted on the side frame members. The upper part of the conveyor is adapted to ride on a pair of spaced wear strips 48 and 49, preferably constructed of Nylatron, which are mounted on the support plate member 37. It will be noted as illustrated in FIGURE 5, that the wear strips 48 and 49 have a sufficient height so that the upper part of the conveyor supported on the wear strips is raised slightly higher than the plane of the top surfaces 31 and 32 of the side frame members 25 and 26. The lower part of the conveyor also is adapted to ride on a pair of similar parallel wear strips 50 and 51, which are supported on the support member 33. It will be appreciated that the wear strips 48 through 51 will permit the conveyor to be guided along a smooth path, having a minimum amount of friction. It also is preferred that the sprockets on which the conveyor is entrained be constructed of a suitable wear resistant material such as Teflon and the like. Secured to selected links on the conveyor are spaced sets of gauge members 52 which project substantially normal relative to the top and bottom planes of the conveyor. As shown in FIGURE 5, the side section 35 of support member 33 and wear strip 50 are disposed sufficiently toward the centerline of the chassis, clear of the return path of the gauge members 52 depending from the lower part of the conveyor.

The mechanism 24 for operating the conveyor 21 and needle and looper assembly 23 synchronously, generally is disposed in a housing 53 supported on a pair of laterally projecting cross members 54 and 55. The housing generally consists of an inner panel 56 connected to the side frame member 25 by means of a connecting section 57, a front panel 58, a rear panel 59, a top panel 60, and a removable outer panel 61. The operating mechanism includes a horizontally disposed main drive or looper shaft 62 journaled in a suitable bearing 63 mounted in an opening in the inner wall 56 of housing 53 and a suitable bearing 64 mounted on the inner side of the vertical web section 38 of side frame member 24. The axis of the looper shaft 62 is disposed substantially normal to the line of travel of the upper part of the conveyor.

Shaft 62 is driven by means of an electric motor 65 mounted on a depending bracket 66, secured to the underside of the chassis, through a variable speed pulley assembly 67, a cross drive shaft 68, and a drive chain 69 entrained on a sprocket 70 mounted on the end of the shaft 68 below the housing 53 and a main drive sprocket 71 mounted on the end of the looper shaft 62 within the housing 53. It will be noted that the sprocket 71 has a substantially larger diameter than the sprocket 70, to provide speed reduction between the shafts 68 and 62. The shaft 68 is journaled adjacent the outer end thereof in a suitable bearing 72 mounted on a depending bracket 73 secured to the inner panel 56 of the housing 53. The opposite end of the shaft 68 is journaled in a suitable bearing 74 mounted on a depending bracket 75 secured to the side frame member 36 of the support member 33.

The variable speed pulley assembly 67 is of the conventional type, generally consisting of a drive pulley 76 mounted on the motor shaft, a drive belt 77 entrained on a split pulley 78 having a spring loaded disk section 79, a split pulley 80 mounted on a common shaft 38 with a split pulley 78, having a spring loaded disk section 82 and a driven belt 83 entrained on the split pulley 80 and a driven pulley 84 mounted on the cross drive shaft 68. The output speed of the assembly 67 is controlled by the movement of a depending arm 85, which carries the split pulley shaft 81 at the lower end thereof. The arm member 85 is pivotally connected to a depending bracket 86 secured to the chassis, which also is provided with a depending portion 87 having a threaded shaft 88 extending through a threaded opening at the lower end thereof. The end of the threaded shaft is adapted to engage the arm member 85 to move the same about its pivotal connection with the depending bracket 86. It will be seen that by rotating the handle 89 of the threaded shaft, the arm member 85 will be pivoted about its connection with the depending member 86 to vary the distances between the axis of the split pulley shaft 81 and the axes of the drive pulley 76 and driven pulley 84. The change in distances between the axes of the pulleys is compensated for by corresponding axial movement of the spring loaded disk sections 79 and 82. It will be appreciated that the change of the distances between the axis of the split pulleys and the axes of the drive and driven pulleys will vary the speed output of the assembly 67.

Drive is transmitted to the conveyor drive shaft 45 by means of drive chains 90 and 91 for operating the conveyor. The drive chain 90 is entrained on a drive sprocket 92 disposed between the inner panel 56 of the housing 53 and the vertical panel 93 of the connecting section 57, and a sprocket 94 mounted on a shaft 95 journaled in a panel 96 of a compartment 97 disposed forwardly of the housing 53 and the vertical side wall 38 of the side frame member 25. The shaft 95 extends into the interior of the chassis and has mounted thereon a sprocket 98, as best seen in FIGURE 6. The drive chain 91 is entrained on the sprocket 98 and a sprocket 99 mounted on the outer end of the conveyor drive shaft 45, as best seen in FIGURES 3 and 4. The sprockets 94 and 98 are selected so as to provide the desired speed reduction between the looper drive shaft 62 and the conveyor drive shaft 46. This direct drive between the looper shaft 62 and the conveyor drive shaft 45 provides a synchronous movement between the needle and looper assembly and the conveyor.

The needle and looper assembly 23 comprises a looper 100 mounted for rotation on the inner end of the looper shaft 62 and a needle 101 secured to the lower end of a vertically reciprocable spindle 102 having a line of travel disposed substantially normal to the axis of the looper shaft 62. As shown in FIGURE 5, the support plate 37 is provided with a cutout 103 to accommodate the looper 100. Also, the top wall 31 of side frame member 25 is interrupted above the looper 100 and is provided with a hinged plate 104 having an opening 105 for receiving the needle 101 therethrough. The hinge plate 104 is adapted to swing outward toward the vertical panel 56 of the housing 53, to permit access to the looper 100.

The spindle 102 is received in a stitching head 106 secured to the inner panel 56 of the housing 53. The stitching head includes a top panel 107, a bottom panel 108 and a front panel 109. The spindle 102 is adapted to move vertically through aligned openings in the upper and lower panels 107 and 108 and is journaled in an upper bearing 110 and a lower bearing 111. Disposed adjacent the stitching head 106 and secured to the inner panel 56 is a compartment 112 for a cone of string 113. The string 114 from the cone is passed through a tube 115, down and about a tensioning device 116, about guide elements 117 and 118 and is threaded through the needle 101 in the conventional manner.

The spindle 102 is reciprocated by means of a rocking arm 119 extending into the stitching head 106 from the housing 53 through a suitable opening in the inner panel 56. The rocker 119 is pivotally mounted for movement in a vertical plane on a bracket 120 secured to the inner panel 56. Telescopically mounted in the forward end of the rocker arm 119 is an extension arm 121 being universally connected with the spindle 102, as at 122. As best illustrated in FIGURE 3, drive is transmitted from the looper shaft 62 to the rocker arm 119 by means of a connecting link 123. The lower end of the connecting link 123 is pivotally connected to a stub shaft disposed on the outer face of sprocket 71, radially offset from the axis of the looper shaft 62. The upper end of link 123 is pivotally connected to the rearward end of the rocker arm 119, as at 124. The connecting link thus is operable to convert rotary motion of the looper shaft to reciprocating motion of the rocker arm, which is transmitted to the needle spindle. The telescopic connection between the rocker arm 119 and the extension arm 121 and the needle spindle, substantially will reduce the application of any forces on the spindle other than along the axis thereof, in transmitting drive from the looper shaft to the needle spindle. It also will be noted there is provided a direct drive between the looper shaft 62 and the needle spindle to provide coordinated movement between the needle and the looper.

The stitching operation of the machine is facilitated by a vertically reciprocable presser foot 125. The presser foot is adapted to firmly and gently hold the tobacco leaves as they are moved past the stitching needle. As illustrated best in FIGURE 8, the presser foot 125 comprises a leading section 126 which is disposed at an acute angle relative to the line of travel of the tobacco, an intermediate section 127 inclined gradually downwardly along the line of travel of the tobacco and a trailing section 128 which is abruptly relieved relative to the intermediate section 127. The upper end of section 128 is secured to a plate member 129 which is slidably secured to a mounting plate 130 depending from a support shaft 131 to permit vertical adjustment of the presser foot. The presser foot support shaft 131 extends into the housing 53, and is journaled in a bearing bracket 132 secured to the inner side of the front panel 58 of the housing. Rigidly secured to the support shaft 131 is an actuating arm 133 having the lower end thereof engaging the cam surface 134 of an eccentric cam 135 mounted on the inner face of the sprocket 71. The actuating arm 133 is urged into continuous contact with the cam surface 134 by means of a spring 136. It will be appreciated as the cam 135 is rotated with the looper shaft, the actuating arm 135 will be reciprocated, causing the presser foot to be reciprocated substantially vertically. It further will be noted that the reciprocating motion of the presser foot will be coordinated with the movement of the conveyor and the operation of the needle and looper assembly.

In operating the embodiment of the invention illustrated in the drawings, the picked tobacco leaves are first placed on the leaf table 22 with the stems of the leaves orientated towards the machine. The leaf table consists of a pair of elongated panels 137 and 138 supported on a pair of stands 139 and 140. The lower ends of the stands are received within L-shaped support members 141 and 142, having horizontal portions 143 and 144 which are received within suitable openings in the chassis. The support members 141 are adjustable laterally relative to the chassis and the stands 139 and 140 may be adjusted vertically relative to the support members 141 and 142 to position the panels 137 and 138 as desired. Suitable set screws are provided to fix the components of the table in the desired position.

The operators of the machine stand on the side of the machine across from the table 22 and reach across the conveyor to grasp small bunches of tobacco. The bunches are pulled toward the operators onto the conveyor, so that the ends of the stems abut against a stem gauge 145 mounted on a laterally extending shelf 146 secured to the side frame member 25 rearwardly of the housing 56. The stem gauge 145 has a base portion 147 which rests on the shelf 146 and which is adjustable laterally thereon to accommodate different stem sizes. As the tobacco is placed onto the conveyor, it is spread evenly between a pair of spaced stick gauges 52. After a first layer of tobacco is spread on the conveyor between the stick gauges, a curing stick 148 is placed on the layer, against a pair of stick gauges. Then, a second layer of tobacco leaves is placed on top of the stick in the same manner as the first layer of leaves. The conveyor then will automatically move the layers of tobacco leaves under the stitching head and the needle and looper assembly will stitch the tobacco leaves about the stick.

After the stitching operation has been performed, the trailing stitching chain will automatically be cut by means of a string cutter 149. Referring to FIGURE 6 of the drawing, the string cutter consists of an arm member 150 secured at a right angle to a shaft 151 extending through a suitable opening in the front panel 58 of the housing 56, which is journaled in a suitable bearing bracket 152. The shaft 151 has an actuating arm 153 which is connected to a vertically movable plunger 154 of a solenoid 155 by means of a linking member 156. Upon energization of the solenoid 155, the arm member 150 is pivoted downwardly so that a cutting element 157 fastened on the free end thereof contacts and severs a stitch chain lying across a cutting block 158. The cutting block 158 is aligned with the opening 105 of hinge plate 104, so that the stitch chain will pass over the cutting block in the path of the cutting element 157. The actuation of the arm member 150 is coordinated with the movement of the conveyor so that it will operate when the trailing end of a stick passes the cutting block. This is accomplished by means of a tripping abutment 159 provided on selected stick gauges which are adapted to trip an electrical switch 160 which actuates the solenoid 155. The switch 160 is mounted on a bracket 161 supported on the side frame member 25, as best seen in FIGURE 5. As the stitched tobacco leaves advance beyond the stitching head, the stems engage and are lifted by an inclined rod 162, which facilitates the removal of the stitched tobacco leaves from the machine. FIGURES 9 and 10 illustrate the stitched tobacco leaves fastened to the curing stick 148 ready to be transported to a curing barn.

Referring to FIGURES 11a through 15b in the drawing, there is illustrated sequential front and side views of the needle and looper assembly during an operating cycle. The looper 100 comprises a stub shaft 163 which is mounted in the end of the looper shaft 62, a circular disk portion 164 and a main body portion 165. The main body portion 165 is disposed substantially diametrically relative to the axis of rotation of the looper and is secured to the disk portion 164 along a radius relative to the axis of rotation, as at 166. The main body portion has inwardly curved front and rear surfaces 167 and 168, an inwardly curved outer surface 169 and an outwardly sloping inner surface 170 defining a diminishing thickness toward the free end thereof. The free end of the main body portion is provided with a hooking element 171 projecting substantially normal to the main body portion 165 and curving first inwardly toward the disk portion and then outwardly, intersecting a plane disposed normal to the axis of rotation of the looper, including the line of travel of the needle 101, to permit the hook element to pick off a segment of string from the needle when the needle is in the lowermost dwell position, as illustrated in FIGURE 11b. The outer surface of the hook element 171 merges with the front surface 167 of the main body portion 166. Formed on the opposite side of the main body portion relative to the hook element 171 is a catch element 172. The lower surface of the catch element 172 forms a continuation of the rear surface 168 of the main body portion 165.

FIGURES 11a and 11b illustrate the beginning of a looping cycle wherein the needle is in the lowermost dwell position and the hook element is picking off a segment of the string. As the looper rotates in a counterclockwise direction relative to FIGURE 11a, the segment of string is drawn downwardly and rides along the surface 167, forming a loop as illustrated in FIGURES 12a and 12b. At this stage of the cycle, the needle is moving upwardly. After the loop is formed, the looper continues to rotate so that the segment of string begins to ride up the opposite side of the main body portion along surface 168, as illustrated in FIGURES 13a and 13b. As this occurs, the needle begins its downward movement. When the segment of string rides to the upper end of the surface 168, it is caught momentarily on the catch element 172 while the needle is again positioned in the lowermost dwell position and the hook element 172 begins picking off the next succeeding segment of string to begin forming the next succeeding loop. It will be noted, however, that the catch 172 holds the preceding loop for a sufficient time, to permit the hook element to pick off and draw the next succeeding segment of string through the retained loop. This is best illustrated in FIGURES 14a and 14b. Following the picking off of the next succeeding loop, the preceding loop is released as illustrated in FIGURES 14a and 14b, to complete the looping cycle.

It has been found that by catching and retaining a preceding loop by means of the catch element 172, a more uniform stitching chain will result, as illustrated in FIGURE 16. It further has been found that the disk section 164 will prevent string and shreds of tobacco leaves, which may be drawn down through the opening 105 of the hinge plate 104, from becoming wrapped around the looper shaft and possibly interfering with the operation of the machine.

The stitching needle 101 as illustrated in detail in FIGURES 17 through 19, preferably is provided with a groove 173 along a substantial portion of its length for guiding the string to the eyelet 174.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What we claim is:

1. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposed spindle and means for operating said advancing means and said needle and looper assembly synchronously comprising rotary drive means, means for driving said rotary drive means, means for transmitting drive from said rotary drive means to said advancing means, means for transmitting rotary drive from said rotary drive means to said looper, a rocking arm mounted on said frame for rocking movement in a vertical plane, said rocking arm having an extension arm telescopically connected thereto having an end thereof universally connected to said vertically disposed spindle and means operatively interconnecting said rotary drive means and said rocker arm for converting rotary motion of said rotary drive means to reciprocating motion of said rocker arm.

2. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposed spindle, and means for operating said advancing means and said needle and looper assembly synchronously comprising a rotary drive shaft, said looper being mounted on the end of said shaft for rotation therewith, means for driving said drive shaft, means for transmitting drive from said drive shaft to said advancing means, a rocker arm mounted on said frame for rocking movement in a vertical plane, said rocking arm having an extension arm telescopically connected thereto having an end thereof universally connected to said vertically disposed spindle and means operatively interconnecting said drive shaft and said rocker arm for converting rotary motion of said drive shaft to reciprocating motion of said rocker arm.

3. A tobacco leaf stitching machine comprising a frame, a continuous conveyor mounted on said frame for supporting and advancing tobacco leaves along a predetermined line of travel, a needle and looper assembly mounted on said frame for stitching said tobacco leaves, said needle being mounted on the lower end of a vertically disposed spindle and means for operating said conveyor and said needle and looper assembly synchronously comprising a main shaft disposed horizontally on said frame, a main drive sprocket mounted on said shaft, means for driving said main drive sprocket, said looper being mounted on an end of said drive shaft for rotation therewith, means for transmitting drive from said shaft to said conveyor, a rocker arm mounted on said frame for rocking movement in a vertical plane, said rocking arm having an extension arm telescopically connected thereto having an end thereof universally connected to said vertically disposed spindle and a linking member operatively interconnecting said rocker arm and said main drive sprocket for converting rotary motion of said main drive sprocket to reciprocating motion of said rocker arm.

4. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposable spindle, vertically reciprocable means mounted on said frame disposed adjacent said needle and looper assembly for pressing said tobacco leaves during the stitching operation thereof and means for operating said advancing means, said needle and looper assembly and said pressing means synchronously comprising rotary drive means, means for driving said rotary drive means, means for transmitting drive from said rotary drive means to said advancing means, means for transmitting drive from said rotary drive means to said looper, means operatively interconnecting said rotary drive means and said pressing means for converting rotary motion of said rotary drive means to reciprocating motion of said pressing means, a rocking arm mounted on said frame for rocking movement in a vertical plane, said rocking arm having an extension arm telescopically connected thereto having an end thereof universally connected to said vertically disposed spindle and means operatively interconnecting said rotary drive means and said rocker arm for converting rotary motion of said rotary drive means to reciprocating motion of said rocker arm.

5. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposed spindle mounted on said frame, vertically reciprocable means mounted on said frame disposed adjacent said needle and looper assembly for pressing said tobacco leaves during the stitching operation thereof and means for operating said advancing means, said needle and looper assembly and said pressing means synchronously comprising a rotary drive shaft, said looper being mounted on the end of said shaft for rotation therewith, means for driving said drive shaft, means for transmitting drive from said drive shaft to said advancing means, means operatively interconnecting said drive shaft and said pressing means for converting rotary motion of said drive shaft to reciprocating motion of said pressing means, a rocker arm mounted on said frame for rocking movement in a vertical plane, said rocking arm having an extension arm telescopically connected thereto having an end thereof universally connected to said vertically disposed spindle and means operatively interconnecting said drive shaft and said rocker arm for converting rotary motion of said drive shaft to reciprocating motion of said rocker arm.

6. A tobacco leaf stitching machine comprising a frame, a continuous conveyor mounted on said frame for supporting and advancing tobacco leaves along a predetermined line of travel, a needle and looper assembly mounted on said frame for stitching said tobacco leaves, said needle being mounted on the lower end of a vertically disposed spindle, a support shaft mounted on said machine, a vertically reciprocable presser foot mounted at one end thereof on said support shaft and means for operating said conveyor, said needle and looper assembly and said presser foot synchronously comprising a main shaft disposed horizontally on said frame, a main drive sprocket mounted on said shaft, means for driving said main drive sprocket, said looper being mounted on an end of said drive shaft for rotation therewith, means for transmitting drive from said shaft to said conveyor, means operatively interconnecting the support shaft of said presser foot and said main drive sprocket for converting rotary motion of said drive means to rotary reciprocating motion of said presser foot comprising a cam member mounted on said main drive sprocket and an arm member secured to said presser foot support shaft having a portion thereof engageable with said cam member, a rocker arm mounted on said frame for rocking movement in a vertical plane, said rocking arm having an extension arm telescopically connected thereto having an end thereof universally connected to said vertically disposed spindle and a linking member operatively interconnecting said rocker arm and said main drive sprocket for converting rotary motion of said main drive sprocket to reciprocating motion of said rocker arm, 7. In a tobacco leaf stitching machine including a frame, means mounted on said frame for supporting and advancing tobacco leaves along a predetermined line of travel, a needle and looper assembly mounted on said frame for stitching said tobacco leaves, said needle being mounted on the lower end of a vertically disposable spindle and vertically reciprocable means mounted on said frame disposed adjacent said needle and looper assembly for pressing said tobacco leaves during the stitching operation thereof, means for operating said advancing means, said needle and looper assembly and said pressing means synchronously comprising rotary drive means, means for driving said rotary drive means, means for transmitting drive from said rotary drive means to said advancing meanus, means for transmitting drive from said rotary drive means to said looper, means operatively interconnecting said rotary drive means and said pressing means for converting rotary motion of said rotary drive means to reciprocating motion of said pressing means, a rocking arm mounted on said frame for rocking movement in a vertical plane, said rocking arm having an extension arm telescopically connected thereto having an end thereof universally connected to said vertically disposed spindle and means operatively interconnecting said rotary drive means and said rocker arm for converting the rotary motion of said rotary drive means to reciprocating motion of said rocker arm.

8. In a tobacco leaf stitching machine including a frame, means mounted on said frame for supporting and advancing tobacco leaves along a predetermined line of travel, a needle and looper assembly mounted on said frame for stitching said tobacco leaves, said needle being mounted on the lower end of a vertically disposed spindle mounted on said frame and vertically reciprocable means mounted on said frame disposed adjacent said needle and looper assembly for pressing said tobacco leaves during the stitching operation thereof, means for operating said advancing means, said needle and looper assembly and said pressing means synchronously comprising a rotary drive shaft, said looper being mounted on the end of said shaft for rotation therewith, means for driving said drive shaft, means for transmitting drive from said drive shaft to said advancing means, means operating interconnecting said drive shaft and said pressing means for converting rotary motion of said drive shaft to reciprocating motion of said pressing means, a rocker arm mounted on said frame for rocking movement in a vertical plane, said rocking arm having an extension arm telescopically connected thereto having an end thereof universally connected to said vertically disposed spindle and means operatively interconnecting said drive shaft and said rocker arm for converting rotary motion of said drive shaft to reciprocating motion of said rocker arm.

9. In a tobacco leaf stitching machine comprising a frame, a continuous conveyor mounted on said frame for supporting and advancing tobacco leaves along a predetermined line of travel, a needle and looper assembly mounted on said frame for stitching said tobacco leaves, said needle being mounted on the lower end of a vertically disposed spindle, a support shaft mounted on said machine and a vertically reciprocable presser foot mounted at one end thereof on said support shaft, means for operating said conveyor, said needle and looper assembly and said presser foot synchronously comprising a main shaft disposed horizontally on said frame, a main drive sprocket mounted on said shaft, means for driving said main drive sprocket, said looper being mounted on an end of said drive shaft for rotation therewith, means for transmitting drive from said shaft to said conveyor, means operatively interconnecting the support shaft of said presser foot and said main drive sprocket for converting rotary motion of said drive means to rotary reciprocating motion of said presser foot comprising a cam member on said main drive sprocket and an arm member secured to said presser foot support shaft having a portion thereof engageable with said cam member, a rocker arm mounted on said frame for rocking movement in a vertical plane, said rocking arm having an extension arm telescopically connected thereto having an end thereof universally connected to said vertically disposed spindle and a linking member operatively interconnecting said rocker arm and said main drive sprocket for converting rotary motion of said main drive sprocket to reciprocating motion of said rocker arm.

10. A presser foot for a tobacco leaf stitching machine having means for supporting and advancing tobacco leaves along a predetermined line of travel, a needle and looper assembly mounted on said frame for stitching said tobacco leaves and operating means for said advancing means and said needle and looper assembly comprising a vertically reciprocable member operatively connected to said operating means for reciprocating the same and said member having a bottom leading edge disposed at an acute angle relative to the line of travel of said tobacco leaves supported on said advancing means, an intermediate bottom edge inclined gradually downwardly along the line of travel of said tobacco leaves and a bottom trailing edge abruptly relieved relative to said intermediate bottom tdge.

11. A presser foot for a tobacco leaf stitching machine having means for supporting and advancing tobacco leaves along a predetermined line of travel, a needle and looper assembly mounted on said frame for stitching said tobacco leaves, a support shaft for said presser foot mounted in said machine and operating means for said advancing means and said needle and looper assembly and for imparting rotary reciprocating motion to said support shaft comprising a member operatively connected at the rearward end thereof to said support shaft for rotary reciprocable movement therewith and vertically adjustable thereto having a bottom leading edge disposed at an acute angle relative to the line of travel of said tobacco leaves supported on said advancing means, an intermediate bottom edge inclined gradually downwardly along the line of travel of said tobacco leaves and a bottom trailing edge abruptly relieved relative to said intermediate bottom edge.

12. A tobacco stitching machine according to claim 4, wherein the looper comprises a rotatable member having hook means for picking off a segment of string from said needle while the needle is in a lower dwell position, means for forming a loop with said segment of string and means for retaining the loop momentarily while said hook means is picking off a succeeding segment of string while the needle is in the next succeeding lower dwell position for passing said second segment of string through said first mentioned loop to similarly form the next succeeding loop.

13. A tobacco stitching machine according to claim 5, wherein the looper comprises a rotatable member having base means being removed from a plane disposed normal to the axis of rotation of said looper including the line of travel of said needle, means disposed diametrically relative to said axis of rotation and secured to said base means along a radius relative to said axis of rotation for forming a loop, said diametrically disposed means having a hook member disposed at the free end thereof projecting in a direction substantially normal to said diametrically disposed means for picking off a segment of string from said needle while the needle is in a lower dwell position and catch means disposed on the opposite side of said diametrically disposed means relative to said hook means for retaining the loop while said hook means is picking off a succeeding segment of string while the needle is in the next succeeding lower dwell position for passing said second segment of string through the retained loop to similarly form the next succeeding loop.

14. A looper for a tobacco stitching machine comprising a rotatable member having means for securing said looper to said machine, hook means for picking off a segment of string from a needle cooperating with said looper while the needle is in a lower dwell position, means for forming a loop with said segment of string, means for retaining the loop while said hook means is picking off a succeeding segment of string and the needle is in the next succeeding lower dwell position for passing said second segment of string through said first mentioned loop to similarly form the next succeeding loop and means disposed between said securing means and said hook, loop forming and retaining means having a sufficient diametrical dimension relative to the rotational axis of said looper for preventing said string from being carried axially relative to the axis of rotation of said looper.

15. A looper for a tobacco stitching machine comprising a rotatable member having base means being removed from a plane disposed normal to the axis of rotation of said looper including a line of travel of a needle cooperating with said looper, means disposed diametrically relative to said axis of rotation and secured to said base means along a radius relative to said axis of rotation for forming a loop, said diametrically disposed means having a hook member disposed at the free end thereof projecting in a direction substantially normal to said diametrically disposed means for picking off a segment of string from said needle while the needle is in a lower dwell position, catch means disposed on the opposite side of said diametrically disposed means relative to said hook means for retaining the loop while said hook means is picking off a succeeding segment of string while the needle is in the next succeeding lower dwell position for passing said second segment of string through the retained loop to similarly form the next succeeding loop, and said base means including a collar portion of sufficient diametrical dimension to prevent said string from moving axially relative to the rotational axis of said looper toward said machine.

16. A tobacco leaf stitching machine comprising a frame, means mounted on said frame for supporting and advancing tobacco leaves along a predetermined line of travel, a needle and looper assembly mounted on said frame for stitching said tobacco leaves, vertically reciprocable means mounted on said frame disposed adjacent said needle and looper assembly for pressing said tobacco leaves during the stitching operation thereof, said pressing means including a bottom leading edge disposed at an acute angle relative to the line of travel of said advancing means, an intermediate bottom edge inclined gradually downwardly along the line of travel of said advancing means and a bottom trailing edge abruptly relieved relative to said intermediate bottom edge, and means for operating said advancing means, said needle and looper assembly and said pressing means synchronously comprising rotary drive means, means for driving said rotary drive means, means for transmitting drive from said rotary drive means to said advancing means, means for transmitting rotary drive from said rotary drive means to said looper, means operatively interconnecting said rotary drive means and said pressing means for converting rotary motion of said rotary drive means to reciprocating motion of said pressing means and means operatively interconnecting said rotary drive means and said needle for converting rotary motion of said rotary drive means to reciprocating motion of said needle.

17. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposable spindle, vertically reciprocable means mounted on said frame disposed adjacent said needle and looper assembly for pressing said tobacco leaves during the stitching operation thereof, said pressing means including a bottom leading edge disposed at an acute angle relative to the line of travel of said advancing means, an intermediate bottom edge inclined gradually downwardly along the line of travel of said advancing means and a bottom trailing edge abruptly relieved relative to said intermediate bottom edge, and means for operating said advancing means, said needle and looper assembly and said pressing means synchronously comprising rotary drive means, means for driving said rotary drive means, means for transmitting drive from said rotary drive means to said advancing means, means for transmitting drive from said rotary drive means to said looper, means operatively interconnecting said rotary drive means and said pressing means for converting rotary motion of said rotary drive means to reciprocating motion of said pressing means, a rocking arm mounted on said frame for rocking movement in a vertical plane, said rocking arm having an extension arm telescopically connected thereto having an end thereof universally connected to said vertically disposed spindle and means operatively interconnecting said rotary drive means and said rocker arm for converting rotary motion of said rotary drive means to reciprocating motion of said rocker arm.

18. A tobacco leaf stitching machine comprising a frame, means mounted on said frame for supporting and advancing tobacco leaves along a predetermined line of travel, a needle and looper assembly mounted on said frame for stitching said tobacco leaves, vertically reciprocable means mounted on said frame disposed adjacent said needle and looper assembly for pressing said tobacco leaves during the stitching operation thereof, said pressing means including a bottom leading edge disposed at an acute angle relative to the line of travel of said advancing means, an intermediate bottom edge inclined gradually downwardly along the line of travel of said advancing means and a bottom trailing edge abruptly relieved relative to said intermediate bottom edge, and means for operating said advancing means, said needle and looper assembly and said pressing means synchronously comprising a rotary drive shaft, means for driving said shaft, said looper being mounted on an end of said drive shaft for rotation therewith, means for transmitting drive from said shaft to said advancing means, means operatively interconnecting said drive shaft and said pressing means for converting rotary motion of said drive shaft to reciprocate motion of said pressing means and means operatively interconnecting said drive shaft and said needle for converting the rotary motion of said drive shaft to reciprocating motion of said needle.

19. A tobacco leaf stitching machine comprising a frame, means mounted on said frame for supporting and advancing tobacco leaves along a predetermined line of travel, a needle and looper assembly mounted on said frame for stitching said tobacco leaves, said needle being mounted on the lower end of a vertically disposed spindle mounted on said frame, vertically reciprocable means mounted on said frame disposed adjacent said needle and looper assembly for pressing said tobacco leaves during the stitching operation thereof, said pressing means being vertically adjustable and including a bottom leading edge disposed at an acute angle relative to the line of travel of said advancing means, an intermediate bottom edge inclined gradually downwardly along the line of travel of said advancing means and a bottom trailing edge abruptly relieved relative to said intermediate bottom edge, and means for operating said advancing means, said needle and looper assembly and said pressing means synchronously comprising a rotary drive shaft, said looper being mounted on the end of said shaft for rotation therewith, means for driving said drive shaft, means for transmitting drive from said drive shaft to said advancing means, means operatively interconnecting said drive shaft and said pressing means for converting rotary motion of said drive shaft to reciprocating motion of said pressing means, a rocker arm mounted on said frame for rocking movement in a vertical plane, said rocking arm having an extension arm telescopically connected thereto having an end thereof universally connected to said vertically disposed spindle and means operatively interconnecting said drive shaft and said rocker arm for converting rotary motion of said drive shaft to reciprocating motion of said rocker arm.

20. A tobacco leaf stitching machine comprising a frame, a continuous conveyor mounted on said frame for supporting and advancing tobacco leaves along a predetermined line of travel, a needle and looper assembly mounted on said frame for stitching said tobacco leaves, said needle being mounted on the lower end of a vertically disposed spindle, a support shaft mounted on said machine, a vertically reciprocable presser foot mounted at one end thereof on said support shaft, said presser foot being vertically adjustable relative to said support shaft and including a bottom leading edge disposed at an acute angle relative to the line of travel of the tobacco leaves supported on the conveyor, an intermediate bottom edge inclined gradually downwardly along said line of travel and a bottom trailing edge abruptly relieved relative to said intermediate bottom edge, and means for operating said conveyor, said needle and looper assembly and said presser foot synchronously comprising a main shaft disposed horizontally on said frame, a main drive sprocket mounted on said shaft, means for driving said main drive sprocket, said looper being mounted on an end of said drive shaft for rotation therewith, means for transmitting drive from said shaft to said conveyor, means operatively interconnecting the support shaft of said presser foot and said main drive sprocket for converting rotary motion of said drive means to rotary reciprocating motion of said presser foot comprising a cam member mounted on said main drive sprocket and an arm member secured to said presser foot support shaft having a portion thereof engageable with said cam member, a rocker arm mounted on said frame for rocking movement in a vertical plane, said rocking arm having an extension arm telescopically connected thereto having an end thereof universally connected to said vertically disposed spindle and a linking member operatively interconnecting said rocker arm and said main drive sprocket for converting rotary motion of said main drive sprocket to reciprocating motion of said rocker arm.

References Cited
UNITED STATES PATENTS

| | | | |
|---|---|---|---|
| 920,141 | 5/1909 | Houston | 112—201 |
| 998,845 | 7/1911 | Heggie | 112—239 |
| 2,327,252 | 8/1943 | Dickerson | 214—5.5 |
| 3,130,844 | 4/1964 | Robinson | 214—5.5 X |
| 3,193,208 | 7/1965 | Brueggemann | 74—104 |
| 3,196,700 | 7/1965 | Gron | 74—104 |

GERALD M. FORLENZA, *Primary Examiner.*

MARVIN A. CHAMPION, ALBERT MAKAY,
*Examiners.*